(No Model.)
J. CARTER.
SLEIGH.
No. 453,546. Patented June 2, 1891.
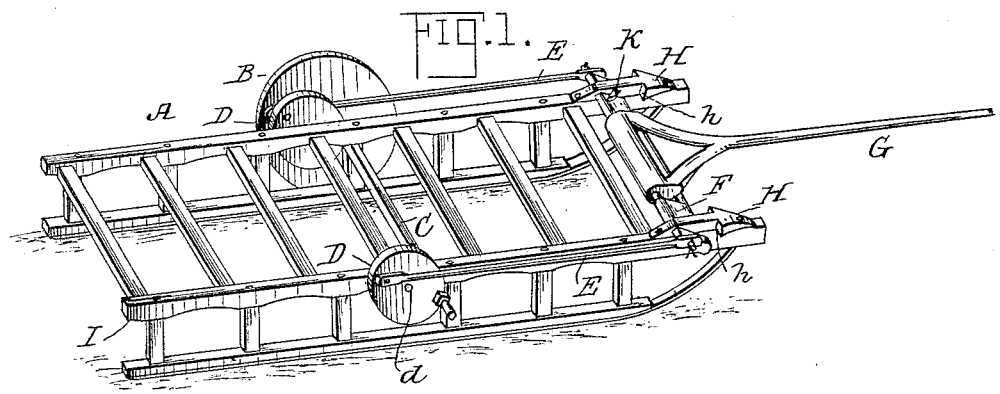
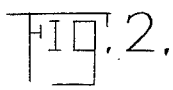
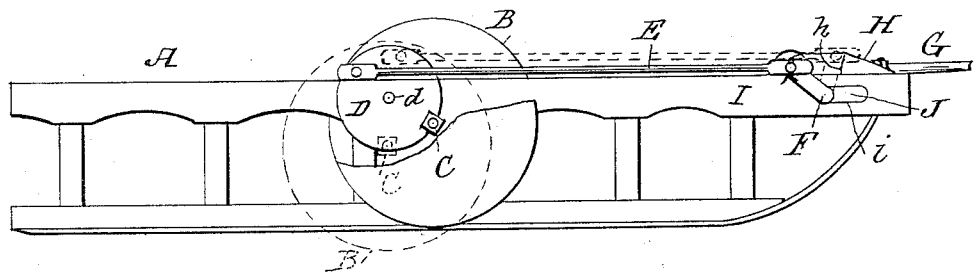
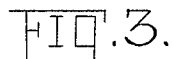
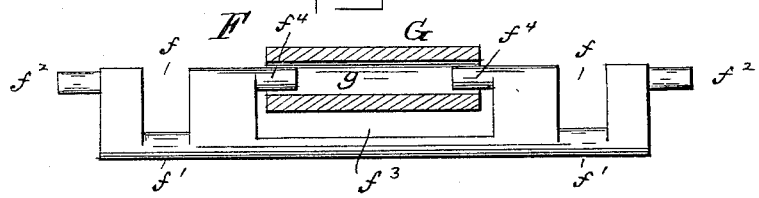
WITNESSES:
Sam'l R. Turner
Van Buren Hillyard
INVENTOR
James Carter
BY
R. S. & H. Lacey
HIS ATTORNEYS

UNITED STATES PATENT OFFICE.

JAMES CARTER, OF EUREKA, OHIO.

SLEIGH.

SPECIFICATION forming part of Letters Patent No. 453,546, dated June 2, 1891.

Application filed August 23, 1890. Serial No. 362,811. (No model.)

*To all whom it may concern:*

Be it known that I, JAMES CARTER, a citizen of the United States, residing at Eureka, in the county of Gallia and State of Ohio, have invented certain new and useful Improvements in Sleighs; and I do hereby declare the following to be a full, clear, and exact description of the invention, such as will enable others skilled in the art to which it appertains to make and use the same.

This invention relates to vehicles, and particularly to the means for elevating the body of the same to facilitate the transportation over bare ground.

The object of the invention is to elevate the vehicle or the body thereof from the ground direct by the draft of the team and to provide simple and efficient means for carrying the invention into effective operation.

The improvement consists of the novel features and the peculiar construction and combination of the parts, which will be hereinafter more fully described and claimed, and which are shown in the annexed drawings, in which—

Figure 1 is a perspective view, the wheel on the near side being removed, of a vehicle embodying my invention. Fig. 2 is a side view, the upper portion of the wheel being broken away of the vehicle, showing the operation of the loading instrumentalities by dotted lines. Fig. 3 is a plan view of the rock-shaft detached.

For simplicity of illustration I have shown the invention applied to a sled in the accompanying drawings. However it will be understood that it is susceptible of application to any kind of vehicle or truck-frame with slight mechanical changes to adapt it to the new location such as will readily suggest themselves to a skilled workman.

The sled or vehicle A is capable of being raised vertically and supported on the draft-wheels B B, which are journaled on the axle C, which is secured to the supports D, which have a pivotal connection with the vehicle-frame at $d$. The rock-shaft F, having pivotal connection with the vehicle-frame, is connected by pitman E with the supports D in such a manner that a rotation of the rock-shaft will effect a corresponding rotation of the said supports D D and cause the shaft or axle C to move so as to project the wheels B B below the runners of the sled to elevate the sled, as shown by dotted lines in Fig. 2, or lift the said wheels from contact with the ground, as shown by full lines in Figs. 1 and 2. The draft is applied eccentrically to the rock-shaft F, so that when the said rock-shaft is released and the draft is applied the said rock-shaft will be rotated, and through the connections hereinbefore described depress the draft-wheels and lift the vehicle. The draft may be applied to the rock-shaft in any well-known manner, preferably by thills or pole G, the latter being the most common form. The rock-shaft F is formed from a flat piece, metal being preferable, which is cut away near its ends at $ff$ to form the journals $f'$, by which it is journaled on the vehicle-frame, and which is provided at its ends with the arms $f^2$, on which are mounted the forward ends of the pitman E. The middle portion of the piece is cut away at $f^3$ to form the pintles $f^4$, which enter the ends of the socket $g$ at the inner end of the pole G. The depressions $f$ are just wide enough to receive the side beams of the vehicle and embrace the sides of the stops H, which are fastened to the said beams. These stops have lateral shoulders $h\ h$, against which the portions of the rock-shaft on each side of the depressions $f$ engage and limit the forward movement of the said rock-shaft when the draft is applied for drawing the vehicle forward. The beams I have openings $i$, which are equal in length to the width of the piece from which the rock-shaft is formed. In assembling the parts the rock-shaft is thrust endwise through the openings $i$ until the depressions $f$ therein coincide with the position of the beams I, when the said eccentric is pushed rearward to bring the journals $f'$ in proper position. Bearing-blocks J are inserted in the front portions of the openings $i$ to fill the space left after the rock-shaft is properly adjusted. The pintles $f^4$ and the journals or arms $f^2$ may be any relative distance from the journals $f'$, and they may be in the same or in different planes, as may be found to give the best results.

The term "vehicle" as used in this description is used in a generic sense to mean the body or frame independent of the running-gear, or the body and running-gear when taken as a whole.

Suitable means may be employed to hold the rock-shaft from rotation on application of the draft or from turning back in the event of the draft being taken off. For this purpose the pin K is provided and is adapted to be inserted in an opening $k$ in the side of the beam I, either in the front of or in the rear of the rock-shaft.

Having thus described my invention, what I claim, and desire to secure by Letters Patent, is—

1. The combination, with the vehicle having openings $i$ in the beams I I and the draft-wheels, of the rock-shaft having connection with the said draft-wheels, formed from a flat piece having depressions $f f$ near its ends to form the journals $f'\ f'$ and adapted to thrust endwise through the said openings $i$, and the bearing-blocks J, inserted in the said openings $i$, substantially as and for the purpose described.

2. The combination, with the vehicle, the axle having draft-wheels mounted thereon, and the pivoted supports D, having the axle secured thereto, of the rock-shaft F, the pitmen connecting the rock-shaft with the said supports D, the pole having connection with the said rock-shaft F, the stops H, and means, as the pin K, for holding the rock-shaft in either of its two positions, substantially as and for the purpose described.

In testimony whereof I affix my signature in presence of two witnesses.

JAMES CARTER.

Witnesses:
 GUS MARTINDILL,
 G. W. MARTINDILL.